(12) United States Patent  
Chappaz

(10) Patent No.: US 8,503,571 B2  
(45) Date of Patent: Aug. 6, 2013

(54) DUAL PURPOSE MODULATOR

(75) Inventor: David Chappaz, Milton (GB)

(73) Assignee: Cambridge Silicon Radio Limited, Cambridge (GB)

( * ) Notice: Subject to any disclaimer, the term of this patent is extended or adjusted under 35 U.S.C. 154(b) by 360 days.

(21) Appl. No.: 12/992,867

(22) PCT Filed: May 14, 2009

(86) PCT No.: PCT/GB2009/001228
§ 371 (c)(1),
(2), (4) Date: Feb. 8, 2011

(87) PCT Pub. No.: WO2009/138759
PCT Pub. Date: Nov. 19, 2009

(65) Prior Publication Data
US 2011/0122970 A1    May 26, 2011

(30) Foreign Application Priority Data
May 15, 2008    (GB) .................................. 0808886.6

(51) Int. Cl.
*H04L 27/00*    (2006.01)

(52) U.S. Cl.
USPC ........................................................ 375/295

(58) Field of Classification Search
USPC ........................................................ 375/295
See application file for complete search history.

(56) References Cited

U.S. PATENT DOCUMENTS

| 4,039,961 | A * | 8/1977 | Ishio et al. ............... 329/308 |
| 6,259,728 | B1 * | 7/2001 | Sharma et al. ............ 375/223 |
| 6,369,666 | B1 * | 4/2002 | Simon et al. .............. 332/100 |
| 2003/0039321 | A1 | 2/2003 | Lee et al. |
| 2005/0220219 | A1 * | 10/2005 | Jensen ...................... 375/302 |
| 2005/0249312 | A1 * | 11/2005 | Bode et al. ................ 375/308 |
| 2005/0286653 | A1 * | 12/2005 | Lai et al. .................. 375/308 |
| 2006/0262878 | A1 * | 11/2006 | Aman et al. ............... 375/297 |
| 2007/0037530 | A1 * | 2/2007 | Peckham et al. .......... 455/102 |

FOREIGN PATENT DOCUMENTS

| WO | WO-2004021659 A1 | 3/2004 |
| WO | WO-2006124165 A2 | 11/2006 |

OTHER PUBLICATIONS

Bode P et al.: "Combined GMSK and 8PSK modulator for GSM and EDGE" Proceedings of the 2003 IEEE International Symposium on Circuits and Systems; Bangkok, Thailand—May 25-28, 2003; IEEE, US pp. III-614, abstract; figures 5,6 p. 616, col. 2, line 16—p. 617, col. 2, line 12.

* cited by examiner

*Primary Examiner* — Juan A Torres
(74) *Attorney, Agent, or Firm* — RatnerPrestia

(57) ABSTRACT

The present invention provides a single modulator capable of transmitting an input according to a first and a second modulation technique. The first modulation technique represents changes in the input using a first set of carrier waveform parameters, such as phase variations, whereas the second modulation technique represents changes in the input using a second set of carrier waveform parameters, such as alternative phase variations. The present invention performs both modulation techniques by expressing the 10 second set of carrier waveform parameters as a subset of the first set of carrier waveform parameters. In a preferred embodiment, the first and second modulation techniques comprise the π/2-offset 2PSK (a good approximation of differential GMSK) and 3π/8-offset 8PSK (also known as EDGE) modulation techniques.

20 Claims, 5 Drawing Sheets

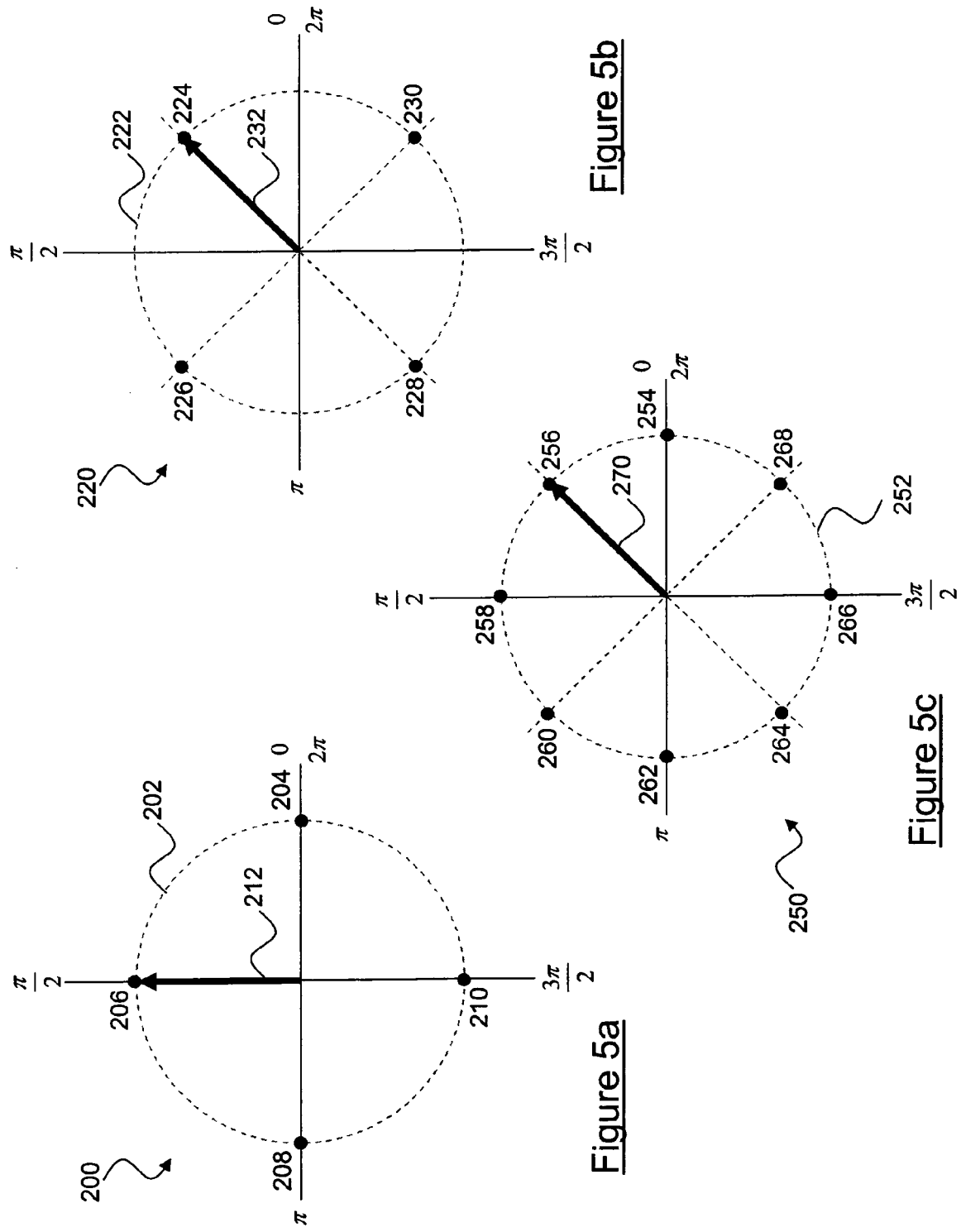

DUAL PURPOSE MODULATOR

REFERENCE TO RELATED APPLICATION

The present application is the U.S. national phase of PCT International Patent Application No. PCT/GB2009/001228, filed May 14, 2009, published on Nov. 19, 2009, as WO 2009/138759 A1, which claims the benefit of GB Patent Application No. 0808886.6, filed May 15, 2008, whose disclosures are hereby incorporated by reference in their entirety into the present disclosure.

TECHNICAL FIELD

The present invention relates to an apparatus having a single modulator that is capable of transmitting input data according to at least two different modulating techniques. The present invention finds application in the field of mobile telecommunications and in particular, although not exclusively, in providing signals modulated according to the Enhanced General Packet Radio Services (E-GPRS) standard.

BACKGROUND OF THE INVENTION

In the field of communications information is typically transmitted from a transmitter to a receiver by modulating a carrier waveform in dependence on the information. More particularly, modulation is the process of varying at least one parameter of a carrier waveform in order to convey the information. For example, it is known to vary the frequency, the amplitude or the phase of a carrier waveform to convey information. A wide variety of different modulation techniques are known in the art, each of which adopts a different convention of varying one or a number of parameters of the carrier in order to convey information. Quadrature Amplitude Modulation (QAM) and Phase Shift Keying (PSK) are two examples of known modulation techniques.

Digital modulation techniques, such as QAM and PSK, involve varying parameters of an analogue carrier signal according to the contents of a digital bit stream. In practice only a finite number of variations in the carrier signal are used by each different modulation technique to convey message information. Each different variation is known as a symbol and the collection of symbols forms the modulation scheme. When plotted on a phasor diagram the collection of symbol positions are referred to as the modulation "constellation". In the case of PSK it is the phase of the analogue carrier signal that is varied in order to convey the contents of the digital bit stream and therefore, each different phase value used by each symbol is assigned a unique pattern of baseband bits. Usually, for a given modulation technique, each different symbol encodes an equal number of baseband bits. Thus a symbol corresponds to a particular sequence of baseband bits and typically represents a particular combination of phase and/or amplitude of the carrier signal. Each symbol has a particular location on a phasor plot of the carrier.

Improvements in digital telecommunications in recent years have resulted in the formation of modulation standards that each utilise a different modulation technique (or combination of techniques) to convey information between a transmitter and a receiver in a communications network. By using more than one modulation technique it is possible to improve communication between a transmitter and a receiver by, for example, increasing data transmission rates and improving data transmission reliability and accuracy. The E-GPRS standard teaches one such example wherein both differential GMSK and EDGE modulation techniques are used to modulate input data so that the data can be conveyed from a transmitter to a receiver and the data is accurately interpreted by the receiver. On the one hand, EDGE (also known as $3\pi/8$-offset 8PSK) is linear and therefore, it is defined based on constellations. On the other hand, differential GMSK is non-linear so it is not defined based on constellations. However, it is known to approximate differential GMSK with $\pi/2$-offset 2PSK modulation which is linear and defined based on constellations.

PRIOR ART

Known E-GPRS modulating devices that implement both differential GMSK and EDGE modulation techniques comprise two modulators; one for providing a differential GMSK signal and the other for providing an EDGE signal. Accordingly, known E-GPRS modulating devices are relatively power intensive, in comparison to other modulating devices that only support a single modulating technique and thus comprise only one modulator. Moreover, the multiple modulators typically consume greater chip area in an integrated circuit implementation. Furthermore, as known E-GPRS modulating devices are often incorporated into mobile communications devices, such as mobile telephones, there is a constant drive to minimise the cost and power consumption of a modulating device design. Thus a need has arisen for an E-GPRS modulating device having reduced power consumption and chip area when compared to known multiple modulators.

SUMMARY OF THE INVENTION

In order to address the above problems, an embodiment of the present invention provides a modulator that implements multiple different modulating techniques and contains only one modulator. Therefore, the power consumption and chip area of the embodiment of the present invention is reduced when compared to known modulating devices that implement multiple different modulating techniques using multiple respective modulators.

More specifically, a first aspect of the present invention provides a modulator for transmitting an input symbol according to one of at least a first modulation scheme or a second modulation scheme, the modulator comprising:
  i. an input arranged to receive the input symbol;
  ii. a modulation element arranged to generate a modulation output symbol for use in modulating a carrier in dependence on the input symbol and a selected one of the first or second modulation schemes; and
  iii. an output for outputting the modulation output symbol;
wherein the first modulation scheme comprises a first set of modulation symbols indicative of a first set of carrier waveform parameters, and the second modulation scheme comprises a second set of modulation symbols indicative of a second set of carrier waveform parameters, the second set of modulation symbols being a subset of the first set of modulation symbols.

In embodiments of the invention the modulation output symbol represents one set of modulation parameters, that are used to modulate a carrier waveform so as to represent the input symbol. That is, the modulation output symbol defines the phase and/or amplitude of the carrier waveform to represent the input symbol. In preferred embodiments that make use of constant envelope modulation schemes (i.e. PSK schemes), the modulation output symbol defines the phase of the carrier waveform that is required.

In a preferred embodiment, therefore, the modulator further comprises a carrier waveform modulator arranged to modulate the carrier waveform so as to cause the carrier waveform to have the waveform parameters defined by the modulation output symbol.

Preferably, in an embodiment the modulation element has one or more modulation control inputs so as to allow the selection of the first modulation scheme or the second modulation scheme. More preferably, the arrangement is such that a modulation scheme is selected for use in dependence on respective numerical values input on the or each control input. Additionally, it is preferable that the modulation element comprises a conversion element arranged in use to convert the input symbols in accordance with a conversion factor. Furthermore, it is preferable that the conversion factor is the numerical value input on one of said modulation control inputs.

Preferably, in an embodiment the modulation element comprises a modulation symbol offset control element arranged to generate a symbol offset control signal in dependence on the number of input symbols which have been transmitted, the symbol offset control signal being combined with the input symbol to generate the modulation output symbol.

Additionally, it is preferable that the modulation symbol offset control element has an offset control input arranged to determine the symbol offset control signal, said offset control input receiving an offset value input on one of said modulation control inputs.

It is preferable that in an embodiment the offset control signal is generated in accordance with $$r_n = (r_{n-1} + x) \mod a$$

wherein $r_n$ is the value of the offset control signal for the present input symbol, $r_{n-1}$ is the value of the offset control signal for the previous input symbol, x is the offset value, and a is the number of possible symbol positions used in the first modulation scheme. Additionally, it is preferable that the control value is 4 when π/2-offset 2PSK is to be selected; and 3 when 3π/8-offset 8PSK is to be selected.

Preferably, the first modulation scheme and the second modulation scheme are both phase modulation schemes. Additionally, it is preferable that the first modulation scheme is 3π/8-offset 8PSK (also known as EDGE), and the second modulation scheme is π/2-offset 2PSK (used as an approximation of differential GMSK). Also, it is preferable that the conversion factor is 8 when π/2-offset 2PSK is to be selected; and 2 when 3π/8-offset 8PSK is to be selected. Finally, it is preferable that the control value is 4 when π/2-offset 2PSK is to be selected; and 3 when 3π/8-offset 8PSK is to be selected.

A second aspect of the present invention provides a method of transmitting an input symbol according to one of at least a first modulation scheme or a second modulation scheme using the same modulator, the method comprising:
  i. receiving the input symbol;
  ii. generating a modulation output symbol for use in modulating a carrier in dependence on the input symbol and a selected one of the first or second modulation schemes; and
  iii. outputting the modulation output symbol;
wherein the first modulation scheme comprises a first set of modulation symbols indicative of a first set of carrier waveform parameters, and the second modulation scheme comprises a second set of modulation symbols indicative of a second set of carrier waveform parameters, the second set of modulation symbols being a subset of the first set of modulation symbols.

Preferably, in an embodiment the method comprises selecting the first modulation scheme or the second modulation scheme, in dependence on respective numerical values input on one or more modulation control inputs. Additionally, it is preferable that the method further comprises converting the input symbols in accordance with a conversion factor. Preferably, the conversion factor is the numerical value input on one of said modulation control inputs.

Preferably, in an embodiment the method comprises generating a symbol offset control signal in dependence on the number of input symbols which have been transmitted, the symbol offset control signal being combined with the input symbol to generate the modulation output symbol.

A third aspect of the present invention provides a modulator for transmitting an input symbol according to one of at least a first modulation scheme or a second modulation scheme, the modulator comprising:
  i) an input arranged to receive the input symbol;
  ii) a modulation element arranged to generate a modulation output symbol for use in modulating a carrier in dependence on the input symbol and a selected one of the first or second modulation schemes; and
  iii) an output for outputting the modulation output symbol;
wherein the first modulation scheme comprises a first set of modulation symbols indicative of a first set of carrier waveform parameters, and the second modulation scheme comprises a second set of modulation symbols indicative of a second set of carrier waveform parameters, the first set of modulation symbols being positioned on a locus and the second set of modulation symbols being positioned on the same locus.

A fourth aspect of the present invention provides a method of transmitting an input symbol according to one of at least a first modulation scheme or a second modulation scheme using the same modulator, the method comprising:
  i) receiving the input symbol;
  ii) generating a modulation output symbol for use in modulating a carrier in dependence on the input symbol and a selected one of the first or second modulation schemes; and
  iii) outputting the modulation output symbol;
wherein the first modulation scheme comprises a first set of modulation symbols indicative of a first set of carrier waveform parameters, and the second modulation scheme comprises a second set of modulation symbols indicative of a second set of carrier waveform parameters, the first set of modulation symbols being positioned on a locus and the second set of modulation symbols being positioned on the same locus.

Within the third and fourth aspects of the invention the same advantages may be obtained, and the same further features used in combination therewith as the further features and advantages noted above in respect of the first and second aspects.

BRIEF DESCRIPTION OF THE DRAWINGS

A description of a preferred embodiment and an alternative embodiment of the present invention, presented by way of example only, will now be made with reference to the accompanying drawings, wherein like reference numerals refer to like parts, and wherein:—

FIG. 5a is a constellation diagram for an exemplary third modulation scheme showing representable symbols and their corresponding representative phase variations.

FIG. 5b is a constellation diagram for an exemplary fourth modulation scheme showing representable symbols and their corresponding representative phase variations.

FIG. 5c is a constellation diagram for the exemplary third and the exemplary fourth modulation schemes according to an alternative embodiment of the present invention.

DESCRIPTION OF THE EMBODIMENTS

Figure 1:
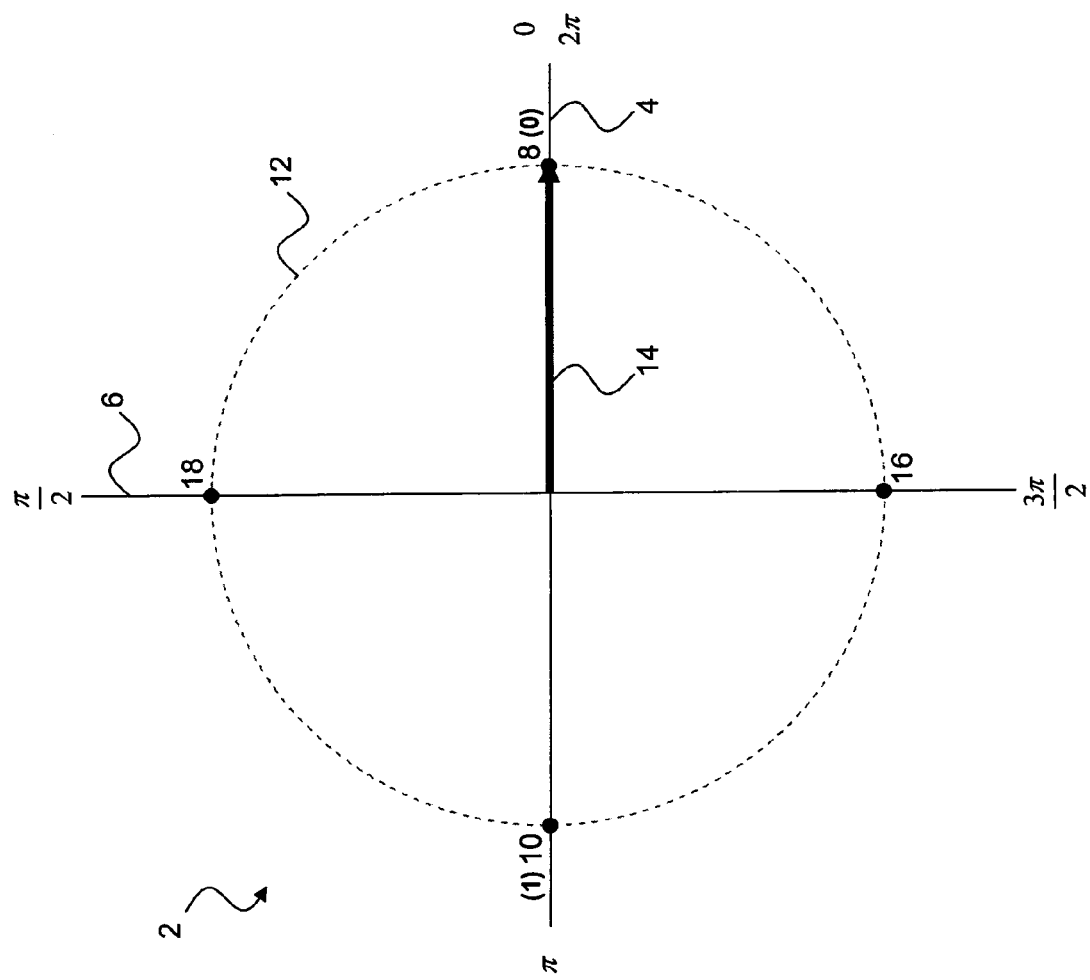
FIG. 1 is a constellation diagram for π/2-offset 2PSK modulation showing representable symbols and their corresponding representative phase variations.

A preferred embodiment of the invention will now be described in detail with reference to the accompanying drawings, wherein like reference numerals relate to like components.

Before going ahead to describe a preferred embodiment of the present invention the following provides a brief discussion of both the π/2-offset 2PSK and EDGE modulation techniques.

It is first noted however, that a GMSK modulated signal, differential or not, is a constant envelope signal. A constant envelope signal may be defined in a number of ways. Firstly, when a constant envelope signal is sampled at its symbol rate, the sampled value of the amplitude of the signal is constant. Secondly, the maximum and minimum amplitude attained by a constant envelope signal over one period is constant. An advantage of constant envelope signals is that they suffer less distortion in high power amplifiers and therefore, such signals are preferred for wireless applications. Although π/2-offset 2PSK provides a linear approximation of non-linear differential GMSK, no linear modulation can genuinely be a constant envelope modulation scheme. Therefore, π/2-offset 2PSK is not strictly a constant envelope modulation scheme.

FIG. 1 shows a constellation diagram 2 for a 2PSK signal. The constellation diagram 2 is a phasor plot of the symbols that can be represented by a 2PSK signal. The constellation diagram has an x-axis 4 representing real values and a y-axis 6 representing imaginary values. Two different symbols, 0, 1 are represented on the circumference of a circle 12 at positions 8, 10 respectively.

A phasor drawn from the origin of the diagram to one of the positions 8, 10 illustrates the required magnitude and phase that a 2PSK carrier signal must have to represent the symbol associated with the chosen position. A phasor 14 is illustrated on FIG. 1 to indicate the amplitude and phase required to represent the symbol 0 associated with the position 8. More specifically, the length of the phasor 14 indicates the required amplitude of the carrier and the angle that the phasor makes with the positive x-axis 4 indicates the required phase of the carrier. Considering the phasor 14, phase labelling located at the ends of the x-axis 4 and the y-axis 6 indicate that the required phase of a 2PSK signal that represents the symbol 0 is 0 (or 2π) and the amplitude is one, assuming that the circle 12 is of unit radius. In view of this, the amplitude of a 2PSK signal that represents either symbol (0 or 1) will be the same because both the positions 8 and 10 lie on the circle 12. The symbols 0, 1 represent the phase of points on the circle 12 in terms of 2π/2 (over 2 because this is 2PSK), as such, '0' represents 'exp(j.0.2π/2)' and '1' represents 'exp(j.1.2π/2)'. Furthermore, with such a constellation a π phase shift is required to move a phasor between the symbols 0 and 1 to represent a transition from one symbol to the other.

As discussed above, a GMSK signal is a constant envelope signal. However for 2PSK, if a π phase shift is required to represent each symbol transition then relatively large phase discontinuities will feature in a 2PSK modulated output signal at symbol transitions and therefore the 2PSK signal will not act as a constant envelope signal. The phasor amplitude effectively passes through the origin to perform a π phase shift. To remedy this and ensure that the signal better approximates a constant envelope signal, a π/2 phase offset is introduced, virtually creating two additional symbol positions 16 and 18 located on the circle 12. Both additional positions 16 and 18 are positioned equidistant from symbol positions 8 and 10. The following explains how the additional positions 16 and 18 are used to reduce the phase shift necessary to transition between symbols.

In operation, a digital input bit-stream comprising multiple 0's and 1's is provided for modulation. Within 2PSK, because there are effectively only two symbols, representing 0 and 1 respectively, there is a one-to-one correspondence between the input bit-stream and the output symbols. A first bit of the input stream is represented in a corresponding 2PSK signal by the corresponding symbol and the phase of the carrier adapted accordingly. Prior to the next symbol transition, the constellation diagram 2 is effectively rotated by π/2. The phasor of the carrier is not therefore positioned at a symbol position and hence to represent the next symbol it must be rotated in order to move to a position which does correspond to a symbol. What is important to note however, is that by virtue of the fact that the constellation diagram 2 has rotated, both the positions 8 and 10 have moved with respect to the original phasor and therefore the phasor now only requires a π/2 (+π/2) or 3π/2 (−π/2) phase shift to transition to the position corresponding to either the symbol 0 or 1. Therefore, there is no longer a π phase shift necessary in the output 2PSK signal to represent a symbol transition in the input stream, and hence the resultant π/2-offset 2PSK signal has reduced phase discontinuities at symbol transitions and acts more as a constant envelope signal.

Figure 2:
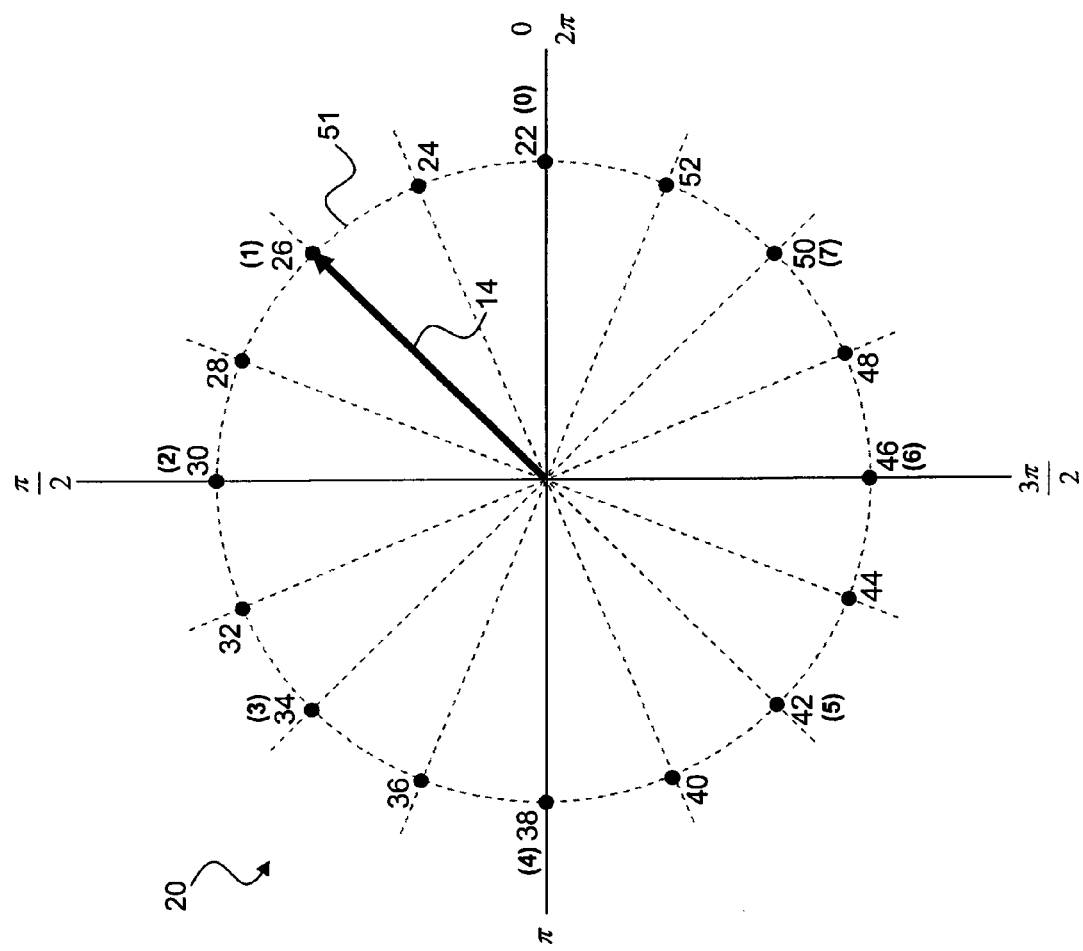
FIG. 2 is a constellation diagram for 3π/8-offset 8PSK modulation showing representable symbols and their corresponding representative phase variations.

Now turning to EDGE modulation, FIG. 2 shows a constellation diagram 20 for an 8PSK signal that is analogous to the 2PSK signal constellation diagram 2 of FIG. 1. However, in contrast to the constellation diagram 2, which only contains two different symbols and four different positions, constellation diagram 20 contains eight different symbols 0, 1, 2, 3, 4, 5, 6 and 7 at respective positions 22, 26, 30, 34, 38, 42, 46 and 50 on a circle 51. The symbols represent the phase of points on the circle 51 in terms of 2π/8 (over 8 because this is 8PSK), for example, '0' represents 'exp(j.0.2π/8)'; '1' represents 'exp(j.1.2π/8)'; '2' represents 'exp(j.2.2π/8)'; '3' represents 'exp(j0.3.2π/8)' and so on.

Also lying on the circle 51 are a further eight additional positions 24, 28, 32, 36, 40, 44, 48 and 52, each of which lies in-between two adjacent symbol positions. As was the case in constellation diagram 2, a phasor drawn from the origin of the circle 51 to anyone of the symbol positions 22, 26, 30, 34, 38, 42, 46 and 50 illustrates the required magnitude and phase of a modulated 8PSK signal that represents the symbol located at that chosen symbol position. Accordingly, a phasor 40 illustrates the required magnitude and phase of an output 8PSK signal that represents the symbol 1. Furthermore, the operation of transmitting a digital input signal according to 8PSK modulation using the constellation diagram 20 is analogous to the operation of 2PSK modulation as discussed above with reference to the constellation diagram 2.

However, there are a number of differences between 8PSK modulation and 2PSK modulation. Firstly, in 8PSK modulation, each individual symbol is capable of representing three bits because it is possible to represent eight different symbols. Therefore, the throughput of 8PSK modulation is greater than 2PSK modulation which can only represent one bit per symbol. Secondly, in 8PSK modulation, the minimum phase shift required to represent a transition between two adjacent input symbols is π/4 and therefore, this phase shift is reduced when compared to 2PSK modulation. However transitions from one symbol to the diametrically opposite symbol on the circle are still allowed, and thus a π phase shift is required, and therefore the 8PSK signal will exhibit substantial envelope variations. To remedy this, the constellation diagram 20 is rotated by 3π/8 following each symbol transition to utilise additional positions 24, 28, 32, 36, 40, 44, 48 and 52, and hence transitions from one symbol to the diametrically opposite symbol on the circle can no longer occur which reduces envelope variations.

Nevertheless, for 8PSK the minimum distance between input symbols is reduced compared to 2PSK modulation which results in modulated signals that represent adjacent but different symbols appearing more similar and therefore, higher bit error rates occur in 8PSK modulation as different signals are mistakenly interpreted as the same signal. As a result of the above mentioned differences between π/2-offset 2PSK modulation and 3π/8-offset 8PSK modulation it has previously been necessary to implement either technique using a modulator that is unsuitable for implementing the other technique.

Thus far, the operation of π/2-offset 2PSK and 3π/8-offset 8PSK as described is conventional. Next we describe the additions provided in the present embodiment to enable a single modulator to perform both π/2-offset 2PSK and 3π/8-offset 8PSK modulation.

In order for the same modulator equipment to perform π/2-offset 2PSK and 3π/8-offset 8PSK modulation the phase shift between adjacent symbols of one of the modulation techniques must be expressed as a subset of the other modulation technique. Also, the phase rotation performed to the constellation diagram following each input symbol transition of one of the modulation techniques must be expressed as a subset of the corresponding phase rotation performed in the other modulation technique.

Figure 3:
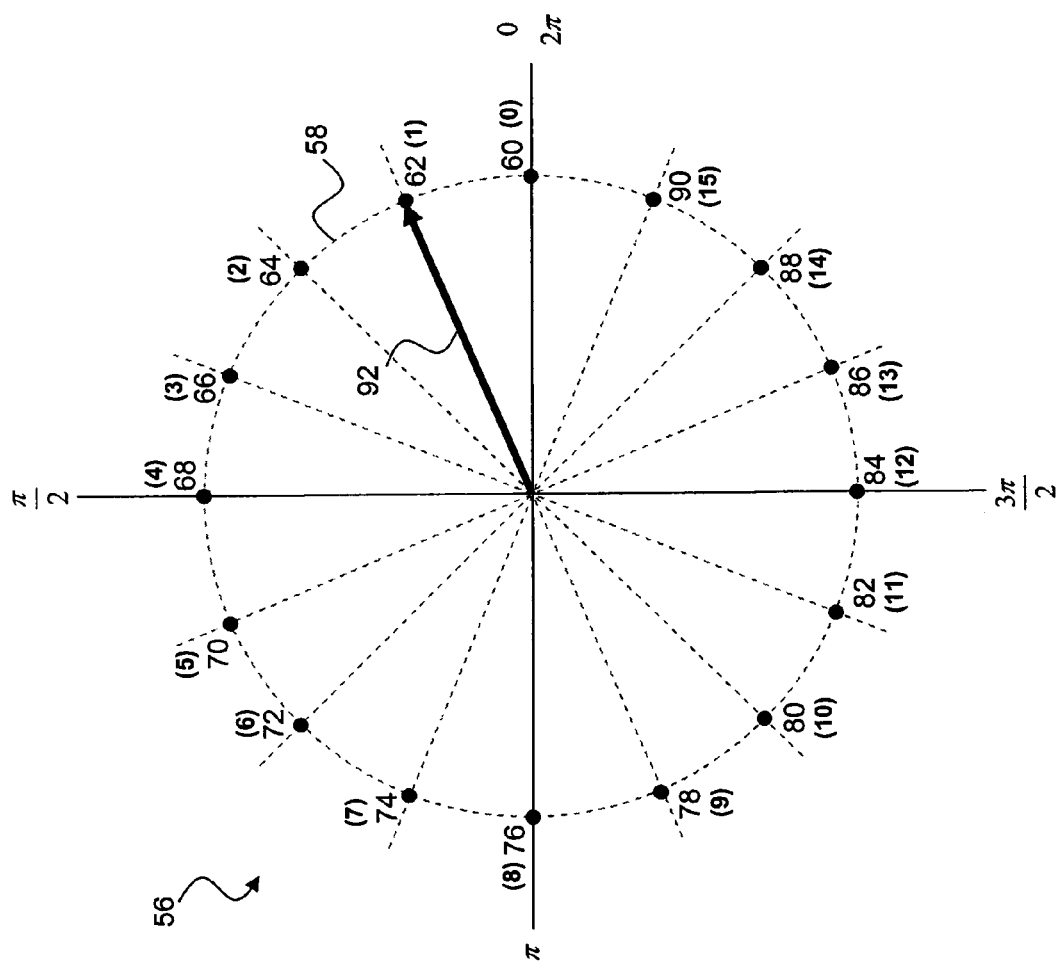
FIG. 3 is a constellation diagram for π/2-offset 2PSK and 3π/8-offset 8PSK modulation according to a preferred embodiment of the present invention.

FIG. 3 shows a constellation diagram 56 comprising a circle 58 having sixteen positions 60 to 90 located at equidistant points around its circumference. As one complete revolution around the circle 58 requires a 2π phase shift, a π/8 phase shift is required to transition between adjacent positions, for example between positions 60 and 62. A phasor 92 is shown between the origin of the circle 58 and the position 62 to illustrate the required magnitude and phase that a modulated signal must have to represent a symbol at the position 62. Operation of the constellation diagram 56 in order to produce both a π/2-offset 2PSK signal and an 3π/8-offset 8PSK signal will now be discussed with reference to FIG. 3.

As discussed previously, in π/2-offset 2PSK modulation there are two different symbols and four different positions. Accordingly, two symbols, 0 and 1 are spaced apart by a phase shift of π at positions 60 and 76 respectively and a single π/2 phase rotation is performed to the constellation diagram 58 at each symbol transition in the input stream. Also, additional positions are located at positions 68 and 84. When the constellation diagram 56 is operated in the above configuration in a manner as described previously with reference to FIG. 1, constellation diagram 58 mimics the operation of the constellation diagram 2 of FIG. 1 and therefore, defines a π/2-offset 2PSK signal.

In view of this, for an input stream comprising k symbols, the complete phase rotation of the constellation diagram 56 which is applied in π/2-offset 2PSK modulation at the transition to the $k^{th}$ symbol is defined by the following expression:

$$\pi/2\text{-offset } 2PSK \text{ Phase Rotation} = 4 \times \frac{k\pi}{8} = \frac{k\pi}{2}$$

In 8PSK modulation, possible symbol values are: 0, 1, 2, 3, 4, 5, 6 and 7, which are located at respective positions: 60, 64, 68, 72, 76, 80, 84 and 88. An equivalent phase rotation expression for 3π/8-offset 8PSK modulation, expressed in the same terms as the above π/2-offset 2PSK phase rotation expression, is defined as follows:

$$3\pi/8\text{-offset } 8PSK \text{ Phase Rotation} = 3 \times \frac{k\pi}{8}$$

It should be noted that for π/2-offset 2PSK modulation, at transitions between each consecutive $k^{th}$ symbol in the input stream, the constellation diagram 56 is rotated to all possible positions each time the constellation diagram 56 makes one complete 2π revolution. Therefore, for example, for the first four k symbols of an input stream, the constellation diagram 56 will be rotated at each input symbol transition so that the position 60 is transposed to each of the following different positions: 60, 68, 76, 84, . . . . Furthermore, this sequence will repeat for subsequent k symbol transitions.

Conversely, in 3π/8-offset 8PSK modulation, at transitions between each consecutive $k^{th}$ symbol in the input stream, the constellation diagram 56 does not rotate through the same sequence of positions every time it makes one complete 2π rotation. Instead, it takes three complete 2π revolutions for the constellation diagram 56 to rotate through each possible position and repeat the sequence from the beginning. Additionally, the angle of rotation at each symbol transition in the input stream is reduced when compared to the corresponding angle used during π/2-offset 2PSK modulation. Therefore, for example, for the first sixteen symbols of an input stream, the constellation diagram 56 is rotated at each input symbol transition so that the position 60 is transposed to the following different positions: 60, 66, 72, 78, 84, 90, 64, 70, 76, 82, 88, 62, 68, 74, 80, 86, . . . . It is noted that this sequence will repeat for subsequent k symbol transitions. It is further noted that all of the positions 60 to 90 feature in one complete sequence.

The reason for expressing the phase rotations for both π/2-offset 2PSK and 3π/8-offset 8PSK as above is that the inventor has realised that by doing so a single modulator can be configured to apply a common $$\frac{k\pi}{8}$$

rotation to operate in both π/2-offset 2PSK and 3π/8-offset 8PSK modes. Then, in order to make this common rotation match the above phase rotation expressions, a conversion factor is applied that has a value of 4 for π/2-offset 2PSK and 3 for 3π/8-offset 8PSK. Thus, a single modulator can be used to produce both π/2-offset 2PSK and 3π/8-offset 8PSK modulation signals, as described further below.

In order for a single modulator to generate both a π/2-offset 2PSK and 3π/8-offset 8PSK signal the symbol sets for both modulation techniques must be appropriately arranged on the constellation diagram 56. Also, the process of translating an input symbol onto the correct position (any one of the positions 60 to 90) of the constellation diagram 56 must be expressed in equivalent terms for both 2PSK and 8PSK modulation. Accordingly, considering 2PSK modulation, there are two different possible symbols, 0 and 1. As mentioned above with reference to phase rotation, these symbols are located at respective positions 60 and 76. Considering 8PSK modulation, there are eight different possible symbols, 0 to 7. Also as mentioned above with reference to phase rotation, these symbols are located at respective positions 60, 64, 68, 72, 76, 80, 84 and 88. If each of the positions 60 to 90 are taken in order and nominally numbered 0 to 15, as indicated on FIG. 3, and each 2PSK symbol is multiplied by a conversion factor of 8 then, a 0-symbol would remain 0 and a 1-symbol would change to 8. As such a value of 0 would translate to the position 60 and a value of 8 would translate to the position 76. Accordingly, an input symbol for 2PSK modulation when multiplied by a conversion factor of 8 would be appropriately positioned on constellation diagram 56.

Considering 8PSK modulation, applying a conversion factor of 2 would appropriately position an input symbol for 8PSK modulation on constellation diagram 56. For example, a symbol value of 5 multiplied by a conversion factor of 2 becomes 10, wherein the corresponding position for number 10 is 80. It was mentioned above with reference to phase rotation that the position 80 corresponds to the symbol 5 and therefore, an input symbol for 8PSK modulation multiplied by a conversion factor of 2 would be appropriately positioned on constellation diagram 56.

Figure 4:
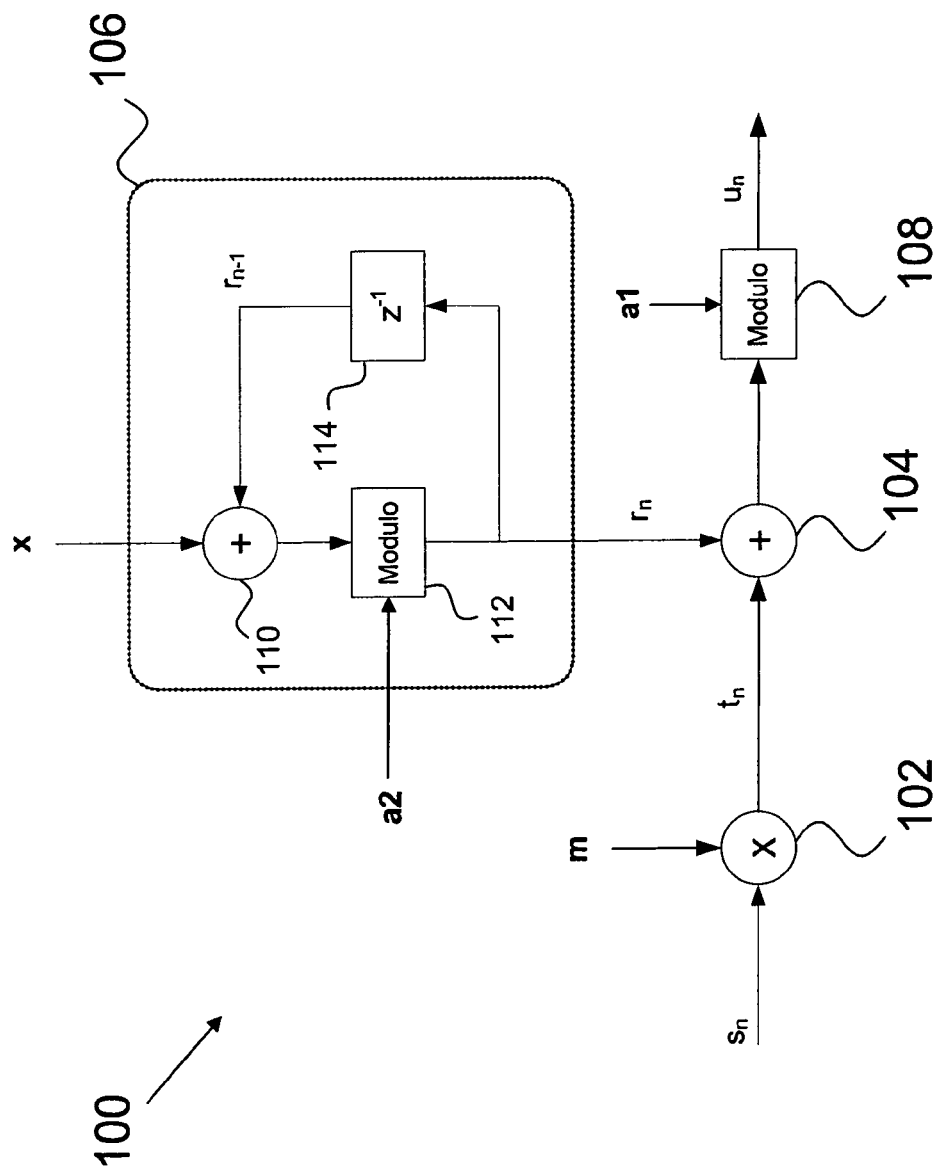
FIG. 4 is a schematic view of a modulator apparatus according to a preferred embodiment of the present invention.

FIG. 4 schematically represents a modulator 100 suitable for including within a communications device, such as a mobile telephone, for transmitting an input symbol stream $s_n$ to generate an output stream $u_n$ that is suitable for use in directly modulating a sequence of corresponding analogue carrier signal phases. Transmitting an analogue carrier signal having a phase which changes according to this sequence enables the information contained within the input stream $s_n$ to be conveyed to a cooperating receiver. Furthermore, the modulator 100 is capable of converting the input stream $s_n$ according to both π/2-offset 2PSK and 3π/8-offset 8PSK modulation techniques, as discussed above with reference to FIG. 3.

The input stream $s_n$ represents a digital stream of symbols to be transmitted according to either π/2-offset 2PSK or 3π/8-offset 8PSK modulation. Each symbol comprises either a single bit integer or a 3-bit integer depending on whether the input stream $s_n$ is to be transmitted according to π/2-offset 2PSK modulation or 3π/8-offset 8PSK modulation respectively. For both modulation schemes each value of the integer corresponds to a phasor position that defines a particular phase value. It stands to reason that more phase values can be defined using a 3-bit integer than can be defined using a single bit integer. Thus, as discussed above, 3π/8-offset 8PSK modulation defines a greater number of different possible phase variations than π/2-offset 2PSK.

The modulator 100 comprises a multiplication element 102 which multiplies together each symbol of the input stream $s_n$ by a conversion factor m to produce a multiplied stream $t_n$ that feeds into a first addition element 104. The first addition element 104 adds two streams to generate a single output stream. The multiplied stream $t_n$ provides one input stream and the other input stream is provided by a control stream $r_n$ that is output from a phase rotation generator 106. A control factor x provides an input to the phase rotation generator 106. The output stream from the first addition element 104 is fed into a first modulo element 108, the resultant output stream from which is the output stream $u_n$. The first modulo element 108 also receives a parameter a1 which sets the value which the output stream from the first addition element 104 is divided by to generate the output stream $u_n$. In other words, the stream $u_n$ equals the remainder of a division of the first addition element 104 output by the parameter a1.

The phase rotation generator 106 further comprises a second addition element 110 which adds the control factor x and a feedback control stream $r_{n-1}$ to generate an output which is fed into a second modulo element 112, the output stream from which is the control stream $r_n$. As discussed with reference to the first modulo element 108, the second modulo element 112 receives a parameter, a2, which sets the value that the input to the second modulo element 112 is divided by in order to generate the output remainder values. The values of a1 and a2 are set to equal the total number of possible symbol positions of the modulation scheme with the largest number of possible symbol positions. In the preferred embodiment, 3π/8-offset 8PSK is the modulation scheme with the largest number of possible symbol positions wherein each one of eight different symbols are located in one of sixteen different possible positions. Accordingly, in the preferred embodiment the value of both a1 and a2 is sixteen and therefore, both the first and second modulo elements 108 and 112 are modulo-16 elements.

As described above, the control stream $r_n$ is fed externally from the phase rotation generator 106 to the first addition element 104. Also, the control stream $r_n$ is fed internally within the phase rotation generator 106 to a delay element 114 that generates the feedback control stream $r_{n-1}$ which is subsequently fed back to the second addition element 110 for addition with the control factor x.

In operation, the modulator 100 performs π/2-offset 2PSK modulation on an input stream $s_n$ comprising a sequence of single bit symbols when the value of the conversion factor m is set to 8 and the value of the control factor x is set to 4. More specifically, $s_n$ comprises a stream of symbols each having a value of either 0 or 1. The stream is first input to the multiplication element 102 wherein each symbol is multiplied by 8 to produce $t_n$ which comprises a stream of symbols each having a corresponding value of either 0 or 8. The purpose of this multiplication is to convert a phase expressed in multiples of 2π/2 (2PSK) into an equivalent expressed in multiples of a common representation, 2π/16 (16PSK). Therefore, the $t_n$ stream represents each symbol value translated onto an appropriate position (one of the positions 60 to 90) of constellation diagram 56. Accordingly, a value of 0 indicates the position 60 and a value of 8 indicates the eighth position anti-clockwise from the position 60, namely the position 76. Furthermore, a phasor drawn on constellation diagram 56 to the appropriate position signifies the phase required by a corresponding π/2-offset 2PSK signal in order to represent the symbol value. It is noted that the amplitude for all positions will be constant as a phasor to any position will have the same length and therefore, it is only the phase which will be considered further.

The position of the phasor as just described enables an accurate phase to be determined for a corresponding π/2-offset 2PSK signal for the first symbol. However, the remaining elements of modulator 100 are required in order to rotate phasor positions to accurately implement the phase rotation as discussed above with reference to FIG. 3.

Accordingly, phase rotation generator 106 advances the position of a phasor corresponding to each consecutive input symbol according to the repeating sequence discussed above with reference to the π/2-offset 2PSK operation of FIG. 3. More specifically, the first value to be output from the phase rotation generator 106 is 0 when the device is first operated. Then, considering that the value of the control factor x is 4 for π/2-offset 2PSK modulation, the value 4 will be added to the previous value (also referred to as the feedback control stream value) of 0 at the second addition element 110 to generate a value of 4. A modulo-16 operation will then be performed to this value by the second modulo element 112 to generate a next value of 4. Phase rotation element 106 will continue to operate in this way and accordingly generate the following repeating sequence 0, 4, 8, 12, 0, . . . .

At the first addition element 104 each consecutive converted symbol of the $t_n$ stream is added to a value of the phase control stream $r_n$ so that each converted symbol is appropriately rotated around the constellation diagram 56. In other words, adding a converted symbol $t_n$ to its corresponding $r_n$ value relocates its corresponding phasor to account for the number of $$\frac{k\pi}{2}$$

phase rotations applied to the constellation diagram 56 as a result of the number of symbol transitions that have occurred in the stream $t_n$ before reaching the converted symbol.

Finally, the stream output from the first addition element 104 feeds into the second modulo element 108 so that any rotation generated by adding together $t_n$, and $r_n$ that is greater than 2π is minimised to an equivalent rotation that is less than 2π. For example, a $t_o$ converted symbol of 8 added to an $r_n$ control value of 12 results in a value of twenty leaving the first addition element 104. As seen more particularly on FIG. 3, counting anti-clockwise around the positions 60 to 90 twenty times results in the position 68. The effect of the second modulo element 108 is to convert the value twenty to the value four which, as can be seen from FIG. 3, provides an equivalent position to twenty, namely the position 68.

Considering the apparatus 100 as a whole, for each symbol of the input stream $s_n$ there is a corresponding value of the converted and rotated output stream $u_n$ leaving the second modulo element 108. Moreover, each corresponding value of the output stream $u_n$ will be a value between 0 and 15 that corresponds to one of the positions 60 to 90 of constellation diagram 56. Thus, for each symbol of the input stream $s_n$ a corresponding value of the output stream $u_n$ defines the position of a phasor which in turn defines the phase of a π/2-offset 2PSK signal which represents that symbol. Although not shown on FIG. 4, downstream of the second modulo element 108, pulse shaping is performed with a filter to control the spectrum of the modulated signal and limit its bandwidth. Additionally, an analogue carrier signal is generated having a phase which varies according to the output stream $u_n$. It is noted that as the amplitude of the carrier signal is substantially constant because phase discontinuities are minimised, this signal closely approximates the genuine differential GMSK signal which is a constant envelope signal and is used in E-GPRS and GSM.

The operational description of the apparatus of FIG. 4 so far has only considered π/2-offset 2PSK modulation. As has been previously stated, the modulator 100 is capable of performing 3π/8-offset 8PSK modulation on an input stream $s_n$ comprising a sequence of 3-bit symbols when the value of the conversion factor m is set to 2 and the value of the control factor x is set to 3. Operation of the modulator 100 in this configuration is analogous to the operation as previously described with reference to π/2-offset 2PSK modulation. Accordingly, each symbol of the input stream $s_n$, or in other words each integer defined by each 3-bits of the input stream $s_n$ can be any one of eight different symbols having a whole number value between 0 and 7. Each of these values is multiplied by 2 at the multiplication element 102 to produce corresponding converted symbols having one of the following values: 0, 2, 4, 6, 8, 10, 12 and 14. Again, the purpose of this multiplication is to convert a phase expressed in multiples of 2π/8 (8PSK) into an equivalent expressed in multiples of a common representation, 2π/16 (16PSK).

When the value of x is set to 3 the output from the phase rotation element 106 will provide the following repeating sequence: 0, 3, 6, 9, 12, 15, 2, 5, 8, 11, 14, 1, 4, 7, 10 and 13. As was the case during π/2-offset 2PSK modulation, in 3π/8-offset 8PSK modulation each converted symbol value of the $t_n$ stream is added at first addition element 104 to the $r_n$ stream having an order according to the repeating sequence. Then, the resultant stream output from the first addition element 104 feeds into the first modulo element 108 to minimise the rotations relating to each summation to produce output stream $u_n$. As before, downstream of the second modulo element 108, pulse shaping is performed with a filter and an analogue carrier signal is generated having a phase which varies according to the output stream $u_n$. Due to the 3π/8 offset, transitions from one symbol to the diametrically opposite one are not allowed, however transitions to "nearly opposite" symbols are allowed. Therefore, the amplitude of an EDGE modulated signal varies substantially, and thus it is not a constant envelope signal.

Therefore, in view of the above explanation the single modulator of FIG. 4 achieves both π/2-offset 2PSK and 3π/8-offset 8PSK modulation. In particular, by converting an input symbol according to an appropriate conversion factor, and adding a rotation control signal thereto, the same modulator hardware can be used to generate different modulated output streams. More particularly, an input symbol stream is converted by a conversion factor dependent on the total number of symbol positions of a first modulation scheme with the largest number of positions, and of which the symbol positions of a second modulation scheme are a subset. The conversion factor for the first scheme is particularly given by the total number of symbol positions of the first scheme divided by the number of discrete symbols of the first scheme. The conversion factor for the second scheme is particularly given by the total number of symbol positions of the first scheme divided by the number of discrete symbols of the second scheme. Then, a rotation control signal is added to the converted input stream, the rotation control signal corresponding to the phase rotation to be applied in the modulation scheme presently being output for the $k^{th}$ output symbol. For example, for 3π/8-offset 8PSK, 3, for π/2-offset 2PSK, 4. The phase rotation to be applied in each modulation scheme can be expressed as follows:

$$\frac{p\pi}{q}$$

wherein p is equal to the valve of the rotation control signal for the particular modulation scheme in question and q defines half of the total number of positions of the first scheme. It is noted that the number of positions in the first scheme is a consequence of the chosen rotation offset. For example, $5\pi/16$-offset 4PSK results in 32 positions or in other words 2×16 positions; and, $3\pi/8$-offset 8PSK results in 16 positions or in other words 2×8 positions. It is further noted that $r_n$ cannot be larger than $2\pi$ because $r_n$ is the output of the modulo element 108, where the parameter a2 is 2q. In this case 2q equals 16 as the first modulation scheme, $3\pi/8$-offset 8PSK, has sixteen possible symbol positions. Therefore, $r_n$ is in the range 0 to 2q−1 which (in multiples of $\pi/q$) corresponds to a maximum angle lower than $2\pi$.

Generally therefore, the concepts of the present invention can be applied to provide further embodiments to be used with different modulation schemes, provided the symbols and possible symbol positions of the modulation schemes are co-incident, such that the symbols and possible symbol positions of one of the modulation schemes are a subset of the symbols and possible symbol positions of another of the schemes. When this is the case, then by appropriate conversion as described followed by the application of the appropriate rotation control signal (if used) then the same modulator hardware can be used to generate a modulated output according to several schemes. For example, the same modulator hardware may be used to generate 16PSK, as well as $3\pi/8$-offset 8PSK and $\pi/2$-offset 2PSK.

The modulator 100 may be modified by the inclusion of an additional phase rotation element (not shown) to provide a variant of the present invention. This variant will now be explained with reference to FIGS. 5a, 5b and 5c.

FIG. 5a shows a constellation diagram 200 comprising circle 202 having four positions 204, 206, 208 and 210 located on its circumference. A phasor 212 indicates the required magnitude and phase to represent position 206. FIG. 5b shows a constellation diagram 220 comprising circle 222 having four positions 224, 226, 228 and 230 located on its circumference. A phasor 232 indicates the required magnitude and phase to represent position 224. The constellation diagrams 200 and 220 define exemplary third and fourth modulation schemes respectively.

In the preferred embodiment as discussed above with reference to FIGS. 1 to 4, the symbol set of $\pi/2$-offset 2PSK modulation was a subset of the symbol set of $3\pi/8$-offset 8PSK modulation. More specifically, the possible symbol positions of $\pi/2$-offset 2PSK modulation were a subset of the possible symbol positions of $3\pi/8$-offset 8PSK modulation. However, there are no possible symbol positions let alone no symbols common to the exemplary third and fourth modulation schemes and therefore, one is not a subset of the other. Instead, one of either the exemplary third or fourth modulation schemes is rotationally offset with respect to the other scheme. In other words, the symbols of either one of the exemplary third or fourth modulation schemes are positioned on the locus defined by the symbols of the other scheme.

In order for the modulator 100 to be able to perform both the exemplary third and fourth modulations schemes it must be able to represent all of the symbol positions present on a constellation diagram 250 of FIG. 5c. The constellation diagram 250 comprises a circle 252 having eight positions 254, 256, 258, 260, 262, 264, 266 and 268 located on its circumference. A phasor 270 indicates the required magnitude and phase to represent position 256. The constellation diagram 250 contains the symbol positions of both the constellation diagrams 200 and 220.

For the modulator 100 to perform the exemplary third modulation scheme, appropriate values of the conversion factor m, the control factor x, and the modulo parameters a1 and a2 must be selected so that the positions 254, 258, 262 and 266 may be transitioned to, as discussed above with reference to FIGS. 1 to 4. Then, in order to perform the exemplary fourth modulation a phase rotation is applied to the output by the additional phase rotation element (not shown) to rotationally offset the output by $+\pi/4$ and thereby facilitate transition to positions 256, 260, 264 and 268. As the number of symbols and the phase shift between symbols is the same for the exemplary third and fourth modulation schemes the values of m, x, a1 and a2, will be the same for both schemes. It is noted that an equally valid implementation is to configure the modulator 100 to perform the exemplary fourth modulation scheme and then apply a $-\pi/4$ phase rotational offset to perform the exemplary third modulation scheme.

Generally, the concepts of the alternative embodiment of the present invention can be applied to provide further embodiments to be used with different modulation schemes, provided the symbol positions of the modulation schemes are located on the same locus. When this is the case, by appropriate conversion as described followed by the application of the appropriate rotation control signal (if used) and the application of an additional rotation offset, the same modulator hardware can be used to generate a modulated output according to several schemes.

It is noted that various further or other modifications may be made to the preferred embodiment and the alternative embodiment without departing from the inventive concept of the present invention as defined in the accompanying claims.

The invention claimed is:

1. An apparatus, comprising:
   a modulator for generating modulation information according to one of at least a first modulation scheme or a second modulation scheme, the modulator comprising:
   i) an input arranged to receive an input symbol;
   ii) a modulation element arranged to generate a modulation output symbol for use in modulating a carrier in dependence on the input symbol and a selected one of the first or second modulation schemes; and
   iii) an output for outputting the modulation output symbol;
   wherein the first modulation scheme comprises a first set of b discrete symbols which may be represented by any of a first set of a modulation symbol positions indicative of a first set of carrier waveform parameters, and the second modulation scheme comprises a second set of y discrete symbols which may be represented by a second set of x modulation symbol positions indicative of a second set of carrier waveform parameters, the second set of modulation symbol positions being a subset of the first set of modulation symbol positions;
   wherein the modulation element comprises a conversion element arranged in use to convert the input symbols in accordance with a conversion factor selected in dependence on the modulation scheme to be used, wherein the conversion factor is given by a/b for the first modulation scheme, and by a/y for the second modulation scheme.

2. The apparatus according to claim 1, wherein the modulation element has one or more modulation control inputs so as to allow the selection of the first modulation scheme or the second modulation scheme, the arrangement being such that a modulation scheme is selected for use in dependence on respective numerical values input on the or each control input.

3. The apparatus according to claim 1, wherein the modulation element further comprises a modulation symbol phase rotation control element arranged to generate a symbol phase rotation control signal in dependence on the number of input symbols which have been transmitted, the symbol phase rotation control signal being combined with the input symbol to generate the modulation output symbol.

4. The apparatus according to claim 1, wherein the first modulation scheme and the second modulation scheme are both phase modulation schemes.

5. The apparatus according to claim 1, wherein the modulation output symbol defines one or more particular carrier waveform parameters that are used to modulate a carrier waveform so as to have the parameters associated with the symbol.

6. The apparatus according to claim 2, wherein the conversion factor is the numerical value input on one of said modulation control inputs.

7. The apparatus according to claim 3, wherein the modulation symbol phase rotation control element has a phase rotation control input arranged to determine the symbol phase rotation control signal, said phase rotation control input receiving a phase rotation value input on a phase rotation control input.

8. The apparatus according to claim 4, wherein the first modulation scheme is 3π/8 offset 8PSK, and the second modulation scheme is π/2-offset 2PSK.

9. The apparatus according to claim 5, wherein the modulation output symbol defines the phase modulation to be applied to the carrier waveform.

10. The apparatus according to claim 7, wherein the phase rotation control signal is generated in accordance with $$r_n = (r_{n-1} + x) \bmod a$$

wherein r is the value of the phase rotation control signal for the present input symbol, $r_{n-1}$ is the value of the phase rotation control signal for the previous input symbol, x is the phase rotation value, and a is the number of possible symbol positions used in the first modulation scheme.

11. The apparatus according to claim 8, wherein the conversion factor is:
8 when π/2-offset 2PSK is to be selected; and
2 when 3 π/8-offset 8PSK is to be selected.

12. The apparatus according to claim 10, wherein the first modulation scheme and the second modulation scheme are both phase modulation schemes, and wherein the phase rotation value is:
4 when π/2-offset 2PSK is to be selected; and
3 when 3π/8-offset 8PSK is to be selected.

13. A method, comprising:
i) receiving an input symbol;
ii) generating a modulation output symbol for use in modulating a carrier in dependence on the input symbol and a selected one of first or second modulation schemes; and
iii) outputting the modulation output symbol;
wherein the first modulation scheme comprises a first set of b discrete symbols which may be represented by any of a first set of a modulation symbol positions indicative of a first set of carrier waveform parameters, and the second modulation scheme comprises a second set of y discrete symbols which may be represented by a second set of x modulation symbol positions indicative of a second set of carrier waveform parameters, the second set of modulation symbol positions being a subset of the first set of modulation symbol positions;
wherein the generating comprises converting the input symbols in accordance with a conversion factor selected in dependence on the modulation scheme to be used, wherein the conversion factor is given by a/b for the first modulation scheme, and by a/y for the second modulation scheme.

14. The method according to claim 13, and further comprising selecting the first modulation scheme or the second modulation scheme, in dependence on respective numerical values input on one or more modulation control inputs.

15. The method according to claim 13, further comprising generating a symbol phase rotation control signal in dependence on the number of input symbols which have been transmitted, the symbol phase rotation control signal being combined with the input symbol to generate the modulation output symbol.

16. The method according to claim 13, wherein the modulation output symbol defines particular carrier waveform parameters that are used to modulate a carrier waveform so as to have the parameter(s) associated with the symbol.

17. The method according to claim 14, wherein the conversion factor is the numerical value input on one of said modulation control inputs.

18. The method according to claim 16, wherein the modulation output symbol defines the phase modulation to be applied to the carrier waveform.

19. An apparatus, comprising:
a modulator for generating modulation information according to one of at least a first modulation scheme or a second modulation scheme, the modulator comprising:
i) an input arranged to receive an input symbol;
ii) a modulation element arranged to generate a modulation output symbol for use in modulating a carrier in dependence on the input symbol and a selected one of the first or second modulation schemes; and
iii) an output for outputting the modulation output symbol; wherein the first modulation scheme comprises a first set of b discrete symbols which may be represented by any of a first set of a modulation symbol positions indicative of a first set of carrier waveform parameters, and the second modulation scheme comprises a second set of y discrete symbols which may be represented by a second set of x modulation symbol positions indicative of a second set of carrier waveform parameters, the first set of modulation symbol positions being positioned on a locus and the second set of modulation symbol positions being positioned on the same locus;
wherein the modulation element comprises a conversion element arranged in use to convert the input symbols in accordance with a conversion factor selected in dependence on the modulation scheme to be used, wherein the conversion factor is given by a/b for the first modulation scheme, and by a/y for the second modulation scheme.

20. A method, comprising:
using at least a first modulation scheme or a second modulation scheme with the same modulator, the using comprising:
i) receiving an input symbol;
ii) generating a modulation output symbol for use in modulating a carrier in dependence on the input symbol and a selected one of the first or second modulation schemes; and
iii) outputting the modulation output symbol; wherein the first modulation scheme comprises a first set of b discrete symbols which may be represented by any of a first set of a modulation symbol positions indicative of a first set of carrier waveform parameters, and the second modulation scheme comprises a second set of y discrete symbols which may be represented by a second set of modulation symbol positions indicative of a second set of carrier waveform parameters, the first set of modulation symbol positions being positioned on a locus and the second set of modulation symbol positions being positioned in the same locus wherein the generating comprises converting the input symbols in accordance with a conversion factor selected in dependence on the modulation scheme to be used, wherein the conversion factor is given by a/b for the first modulation scheme, and by a/y for the second modulation scheme.

\* \* \* \* \*

UNITED STATES PATENT AND TRADEMARK OFFICE
CERTIFICATE OF CORRECTION

PATENT NO. : 8,503,571 B2  
APPLICATION NO. : 12/992867  
DATED : August 6, 2013  
INVENTOR(S) : Chappaz Page 1 of 1

It is certified that error appears in the above-identified patent and that said Letters Patent is hereby corrected as shown below:

In the Specification

In Column 6, Line 11, delete "a it" and insert -- a $\pi$ --, therefor.

In Column 6, Line 55, delete "'exp(j0.3.2π/8)'" and insert -- 'exp(j.3.2π/8)' --, therefor.

In Column 7, Line 14, delete "a it" and insert -- a $\pi$ --, therefor.

In Column 11, Line 14, delete "next" and insert -- next $r_n$ --, therefor.

In Column 11, Line 34, delete "$t_r$," and insert -- $t_n$ --, therefor.

In Column 11, Line 36, delete "a $t_o$" and insert -- a $t_n$ --, therefor.

In Column 12, Line 8, delete "$s_n$ can" and insert -- $s_n$, can --, therefor.

In the Claims

In Column 15, Line 34, In Claim 10, delete "wherein r" and insert -- wherein $r_n$ --, therefor.

In Column 17, Line 7, in Claim 20, delete "positioned in the same locus" and insert -- positioned on the same locus; --, therefor.

Signed and Sealed this  
Third Day of December, 2013

Margaret A. Focarino  
*Commissioner for Patents of the United States Patent and Trademark Office*